US008394475B2

(12) United States Patent
McGoldrick et al.

(10) Patent No.: US 8,394,475 B2
(45) Date of Patent: *Mar. 12, 2013

(54) INDUSTRIAL POLYOLEFIN PIPING SYSTEM

(75) Inventors: James McGoldrick, Marchtrenk (AT); Siegfried Liedauer, Wilhering (AT); Carl-Gustaf Ek, Vaestra Froelunda (SE)

(73) Assignee: Borealis Technology Oy, Porvoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/025,772

(22) Filed: Feb. 11, 2011

(65) Prior Publication Data
US 2011/0132478 A1 Jun. 9, 2011

Related U.S. Application Data

(63) Continuation of application No. 10/478,401, filed as application No. PCT/EP02/05550 on May 21, 2002, now abandoned.

(30) Foreign Application Priority Data

May 21, 2001 (EP) .................................. 01112365

(51) Int. Cl.
| B32B 1/08 | (2006.01) |
| B32B 1/02 | (2006.01) |
| B32B 1/00 | (2006.01) |
| B32B 27/32 | (2006.01) |
| F16L 9/14 | (2006.01) |
| B32B 27/00 | (2006.01) |
| B29C 43/02 | (2006.01) |
| B29C 45/00 | (2006.01) |
| B29C 47/00 | (2006.01) |
| B29C 49/00 | (2006.01) |
| B29D 23/00 | (2006.01) |
| C08J 5/00 | (2006.01) |
| D01D 5/24 | (2006.01) |

(52) U.S. Cl. .................. 428/36.9; 428/35.7; 428/36.91; 428/36.92; 138/140; 264/171.28; 264/209.1; 264/328.1; 264/331.17; 264/523

(58) Field of Classification Search .............. 428/34.1, 428/35.7, 36.9, 36.91, 36.92; 138/140, DIG. 7; 264/171.28, 209.1, 328.1, 331.17, 523
See application file for complete search history.

(56) References Cited

U.S. PATENT DOCUMENTS

| 4,386,129 | A |   | 5/1983  | Jacoby et al. |         |
|-----------|---|---|---------|---------------|---------|
| 4,606,953 | A |   | 8/1986  | Suzuki et al. |         |
| 4,975,469 | A |   | 12/1990 | Jacoby et al. |         |
| 4,981,938 | A | * | 1/1991  | Hanari et al. | 526/351 |
| 5,231,126 | A |   | 7/1993  | Shi et al.    |         |
| 5,310,584 | A |   | 5/1994  | Jacoby et al. |         |
| 5,362,808 | A |   | 11/1994 | Brosius et al.|         |
| 5,387,386 | A |   | 2/1995  | Kirjavainen   |         |
| 5,681,922 | A | * | 10/1997 | Wolfschwenger et al. | 528/486 |
| 5,716,998 | A | * | 2/1998  | Munakata et al. | 521/58 |
| 5,824,714 | A |   | 10/1998 | Broennum et al. |       |
| 6,051,638 | A |   | 4/2000  | Auger et al.  |         |
| 6,187,402 | B1|   | 2/2001  | Ek et al.     |         |
| 6,235,823 | B1|   | 5/2001  | Ikeda et al.  |         |
| 6,251,995 | B1|   | 6/2001  | Hesse et al.  |         |
| 6,279,614 | B1|   | 8/2001  | Riesselmann et al. |    |
| 6,433,087 | B1|   | 8/2002  | Ebner et al.  |         |
| 6,444,301 | B1|   | 9/2002  | Davidson et al. |       |
| 6,503,993 | B1|   | 1/2003  | Huovinen et al. |       |
| 6,747,103 | B1|   | 6/2004  | Vestberg et al. |       |
| 7,235,203 | B2| * | 6/2007  | Sadamitsu et al. | 264/210.7 |
| 2003/0008091 | A1 | * | 1/2003 | Konrad et al. | 428/36.9 |
| 2003/0157286 | A1 |   | 8/2003 | Hesse et al.  |         |
| 2004/0157019 | A1 |   | 8/2004 | McGoldrick et al. |    |
| 2004/0157969 | A1 |   | 8/2004 | McGoldrick et al. |    |
| 2004/0165156 | A1 |   | 8/2004 | Akiyama       |         |
| 2004/0170790 | A1 |   | 9/2004 | Ek et al.     |         |
| 2005/0025922 | A1 |   | 2/2005 | Rydin et al.  |         |
| 2005/0277720 | A1 |   | 12/2005 | Ek et al.    |         |

FOREIGN PATENT DOCUMENTS

| DE | 36 10 644    | 10/1986 |
| EP | 0 142 724    | 5/1985  |
| EP | 0 190 889    | 8/1986  |
| EP | 0 384 431    | 8/1990  |
| EP | 0 450 342    | 10/1991 |
| EP | 0 557 721    | 9/1993  |
| EP | 0 574 804    | 12/1993 |
| EP | 0 634 454    | 1/1995  |
| EP | 0 678 527    | 10/1995 |
| EP | 0 688 817    | 12/1995 |
| EP | 0 790 262    | 8/1997  |
| EP | 1 174 261    | 1/2002  |
| JP | 60-110717    | 6/1985  |
| WO | WO-93/12262  | 6/1993  |
| WO | WO-96/23239  | 8/1996  |
| WO | WO-97/13790  | 4/1997  |

(Continued)

OTHER PUBLICATIONS

Varga et al. "Beta-modification of isotactic polypropylene" in Polypropylene: An A-Z reference, J. Karger-Kocsis ed., Kluwer Academic Publishers, pp. 51-75, 1999.*

(Continued)

*Primary Examiner* — Walter B Aughenbaugh
(74) *Attorney, Agent, or Firm* — Jordan and Hamburg LLP

(57) ABSTRACT

Industrial polyolefin piping system with improved stiffness, impact strength for use at high service temperature, comprising single or multilayer pipes, fitting, chambers, valves and vessels, consisting of β-nucleated propylene homopolymers with an $IR\tau \geq 0.98$ having a tensile modulus $\geq 1500$ MPa, a Charpy impact strength, notched, at $+23°$ C. $\geq 30$ kJ/m$^2$ and a Vicat B temperature $>90°$ C. and a Heat Distortion Temperature $>100°$ C. The industrial polyolefin piping system is suitable for chemical plant constructions comprising single or multilayer pipes, fittings, chambers, valves and vessels with improved stiffness, impact strength and high service temperature, preferred for conveyance of natural gas, dangerous liquids and/or toxic liquids.

16 Claims, No Drawings

FOREIGN PATENT DOCUMENTS

| | | |
|---|---|---|
| WO | WO-97/33117 | 9/1997 |
| WO | WO-98/43806 | 10/1998 |
| WO | WO-99/16797 | 4/1999 |
| WO | WO-99/24478 | 5/1999 |
| WO | WO-99/35430 | 7/1999 |
| WO | WO99/40151 * | 8/1999 |
| WO | WO-01/40327 | 6/2001 |
| WO | WO-02/38670 | 5/2002 |

OTHER PUBLICATIONS

Thermal behaviour of polypropylene fractions: 1. Influence of tacticity and molecular weight on Crystalization and melting behaviour, Ritva Paukkeri, et al.; Polymer, 1993, vol. 34, No. 19, pp. 4075-4082.

"Polypropylene: An A-Z reference", ed. Karger-Kocsis, J., Kluwer Academic Publishers, Dordrecht, The Netherlands, 1999.

* cited by examiner

INDUSTRIAL POLYOLEFIN PIPING SYSTEM

STATEMENT OF RELATED APPLICATIONS

The present application is a continuation of U.S. application Ser. No. 10/478,401, filed Feb. 25, 2004, now abandoned which is the U.S. national stage of International Application No. PCT/EP02/05550, filed on May 21, 2002. The disclosures of these application are incorporated herein by reference.

FIELD OF THE INVENTION

The invention relates to an industrial polyolefin piping system with improved stiffness, impact strength for use at high service temperature, comprising single or multilayer pipes, fittings, valves, chambers and vessels, consisting of a propylene homopolymer, as well as a process for producing them.

BACKGROUND OF THE INVENTION

Pipes, injection molded parts and blow molded parts from propylene polymers are known (Moore, P., Polypropylene Handbook, Hanser Publishers Munich 1996, pp. 303-348). Of disadvantage of propylene polymer moldings from common propylene polymers are the insufficient impact properties of the moldings for industrial applications.

Known methods for improving the impact properties are the use of blends comprising propylene polymers and butene polymers for producing pipes (EP 0 972 801), the use of blends comprising propylene polymers and hydrogenated butadiene-isoprene block copolymers for blow molded containers (JP 09,227,707) or the use of blends comprising propylene polymers and thermoplastic elastomers such as styrene-ethylene-butene-block copolymers or propylene-ethylene-diene terpolymers for producing injection molded parts (DE 199 27 477). These molded articles have good impact properties, of disadvantage is however the reduced stiffness of the articles.

OBJECT OF THE INVENTION

It is the object of the present invention to provide an industrial polyolefin piping system with improved stiffness, impact strength for use at high service temperature, comprising pipes, fittings, valves and vessels from propylene polymers.

BRIEF DESCRIPTION OF THE INVENTION

According to the present invention, this object is achieved by an industrial polyolefin piping system with improved stiffness and impact strength for use at high service temperature, comprising single- or multilayer pipes, fittings, valves and vessels, consisting essentially of a propylene homopolymer with a melt index of 0.05 to 40 g/10 min at 230° C./2.16 kg, wherein the propylene homopolymer is β-nucleated and has an IRτ≧0.98, having a tensile modulus ≧1500 MPa, a Charpy impact strength at +23° C. of ≧30 kJ/m², using notched test specimens, a Vicat B temperature >90° C. and a heat distortion temperature >100° C.

DETAILED DESCRIPTION OF THE INVENTION

β-nucleated propylene polymers are isotactic propylene polymers composed of chains in a $3_1$ helical conformation having an internal microstructure of β-form spherulites being composed of radial arrays of parallel stacked lamellae. This microstructure can be realized by the addition of β-nucleating agents to the melt and crystallization. The presence of the β-form can be detected through the use of wide angle X-ray diffraction (Moore, J., Polypropylene Handbook, p. 134-135, Hanser Publishers Munich 1996).

The IRτ of the propylene polymers is measured and calculated as described in EP 0 277 514 A2 on page 5 (column 7, line 53 to column 8, line 11).

According to a preferred embodiment the β-nucleated propylene homopolymers have an IRτ of ≧0.985. The difference of 0.005 in IRτ, IRτ being a measure for isotacticity, encompasses a significant increase in mechanical polymer properties, especially in stiffness.

According to a preferred embodiment of the invention the β-nucleated propylene polymers used for producing the industrial piping system have a melt index of 0.05 to 15 g/10min at 230° C./2.16 kg, more preferably 0.1 to 8 g/10 min at 230° C./2.16 kg, most preferably 0.2 to 5 g/10 min at 230° C./2.16 kg.

For single- or multilayer pipe fabrication by extrusion propylene homopolymers with a melt index of 0.05 to 40 g/10 min at 230° C./2.16 kg, preferably 0.05 to 15 g/min at 230° C12.16 kg are particularly suitable. For producing fittings and valves by injection molding propylene homopolymers with a melt index of 0.05 to 40 g/10 min at 230° C./2.16 kg are particularly suitable. For vessel fabrication by blow molding a propylene homopolymer with a melt index of 0.05 to 20 g/10 min at 230° C./2.16 kg are particularly suitable.

The propylene homopolymers used for producing the industrial piping system show a Charpy impact strength of ≧30 kJ/m², preferably ≧50 kJ/m², most preferably ≧70 kJ/m² at +23° C.

According to an advantageous feature of the present invention, the β-nucleated propylene polymers with an IRτ≧0.98 of the industrial polyolefin piping system are propylene polymers obtained by polymerization with a Ziegler-Natta catalyst system comprising titanium-containing solid components, an organoalumina, magnesium or titanium compound as cocatalyst and an external donor according to the formula

wherein R and R' are identical or different and are branched or cyclic aliphatic or aromatic hydrocarbon residues, and y and x independently from each other are 0 or 1, provided that x+y are 1 or 2.

A preferred external donor in the Ziegler-Natta catalyst system for producing the propylene polymers for the industrial polyolefin piping system is dicyclopentyldimethoxysilane.

According to a preferred embodiment of the present invention the β-nucleated propylene polymers of the industrial polyolefin piping system contain 0.01 to 2.0 wt %, based on the polypropylene used, dicarboxylic acid derivative type diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids, and/or diamine derivative type diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines, and/or amino acid derivative type diamide compounds from amidation reaction of $C_5$-$C_8$-alkyl, $C_5$-$C_8$-cycloalkyl- or $C_6$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic mono-amines, as β-nucleating agent.

Examples of the dicarboxylic acid derivative type diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids, optionally contained in the β-nucleated propylene polymers of the industrial polyolefin piping system, are N,N'-di-$C_5$-$C_8$-cycloalkyl-2,6-naphthalene dicarboxamide compounds such as N,N'-dicyclohexyl-2,6-naphthalene dicarboxamide and N,N'-dicyclooctyl-2,6-naphthalene dicarboxamide, N,N'-di-$C_5$-$C_8$-cycloalkyl-4,4-biphenyldicarboxamide compounds such as N,N'-dicyclohexyl-4,4-biphenyldicarboxamide and N,N'-dicyclopentyl-4,4-biphenyldicarboxamide, N,N'-di-$C_5$-$C_8$-cycloalkyl-terephthalamide compounds such as N,N'-dicyclohexylterephthalamide and N,N'-dicyclopentylterephthalamide, N,N'-di-$C_5$-$C_8$-cycloalkyl-1,4-cyclohexanedicarboxamide compounds such as N,N'-dicyclo-hexyl-1,4-cyclohexanedicarboxamide and N,N'-dicyclohexyl-1,4-cyclopentanedicarboxamide.

Examples of the diamine derivative type diamide compounds from $C_5$-$C_8$-cycloalkyl-mono-carboxylic acids or $C_6$-$C_{12}$-aromatic monocarboxylic acids and $C_5$-$C_8$-cycloaliphatic or $C_6$-$C_{12}$-aromatic diamines, optionally contained in the industrial polyolefin piping system, are N,N'-$C_6$-$C_{12}$-arylene-bis-benzamide compounds such as N,N'-p-phenylene-bis-benzamide and N,N'-1,5-naphthalene-bis-benzamide, N,N'-$C_5$-$C_8$-cycloalkyl-bis-benzamide compounds such as N,N'-1,4-cyclopentane-bis-benzamide and N,N'-1,4-cyclohexane-bis-benzamide, N,N'-p-$C_6$-$C_{12}$-arylene-bis-$C_5$-$C_8$-cycloalkylcarboxamide compounds such as N,N'-1,5-naphthalene-bis-cyclohexanecarboxamide and N,N'-1,4-phenylene-bis-cyclohexanecarboxamide, and N,N'-$C_5$-$C_8$-cycloalkyl-bis-cyctohexanecarboxamide compounds such as N,N'-1,4-cyclopentane-bis-cyclohexanecarboxamide and N,N'-1,4-cyclohexane-bis-cyclohexanecarboxamide.

Examples of the amino acid derivative type diamide compounds, optionally contained in the 13-nucleated propylene polymers of the industrial polyolefin piping system, are N-phenyl-5-(N-benzoylamino)pentaneamide and/or N-cyclohexyl-4-(N-cyclohexyl-carbonylamino)benzamide.

According to a fUrther advantageous embodiment of the present invention the β-nucleated propylene polymers of the industrial polyolefin piping system contain 0.0001 to 2.0 wt %, based on the polypropylene used, quinacridone type compounds, preferably quinacridone, dimethylquinacridone and/or dimethoxyquinacridone; quinacridonequinone type compounds, preferably quinacridonequinone, a mixed crystal of 5,12-dihydro(2,3b)acridine-7,14-dione with quino(2,3b)acridine-6,7,13,14-(5H,12H)-tetrone as disclosed in EP-B 0 177 961 and/or dimethoxyquinacridonequinone; and/or dihydroquinacridone type compounds, preferably dihydroquinacridone, dimethoxydihydroquinacridone and/or dibenzodihydroquinacridone, as β-nucleating agent.

According to a further advantageous embodiment of the present invention the β-nucleated propylene polymers of the industrial polyolefin piping system contain 0.01 to 2.0 wt %, based on the polypropylene used, dicarboxylic acid salts of metals from group IIa of periodic system, preferably pimelic acid calcium salt and/or suberic acid calcium salt; and/or mixtures of dicarboxylic acids and salts of metals from group Ha of periodic system, as β-nucleating agent.

According to a further advantageous embodiment of the present invention the β-nucleated propylene polymers of the industrial polyolefin piping system contain 0.01 to 2.0 wt %, based on the polypropylene used, salts of metals from group IIa of periodic system and imide acinic of tha formula

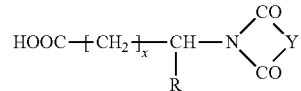

wherein x=1 to 4; R=H, —COOH, $C_1$-$C_{12}$-alkyl, $C_6$-$C_8$-cycloalkyl or $C_6$-$C_{12}$-aryl, and Y=$C_1$-$C_{12}$-alkyl, $C_5$-$C_8$-cycloalkyl or $C_6$-$C_{12}$-aryl—substituted bivalent $C_6$-$C_{12}$-aromatic residues, preferably calcium salts of phthaloylglycine, hexahydrophthaloylglycine, N-phthaloylalanine and/or N-4-methylphthaloyiglycine, as β-nucleating agent.

Preferably the β-nucleated propylene polymers of the industrial piping system are propylene polymers produced by melt mixing propylene homopolymers with 0.0001 to 2.0% by weight, based on the polypropylenes used, β-nucleating agents at temperatures from 175 to 250° C.

The propylene polymers used for the inventive industrial polyolefin piping system articles may contain usual auxiliary materials, e.g. 0.01 to 2.5 wt % stabilizers and/or 0.01 to 1 wt % processing aids and/or 0.1 to 1 wt % antistatic agents and/or 0.2 to 3 wt % pigments, in each case based on the propylene polymers used.

As stabilizers preferably mixtures of 0.01 to 0.6 wt % of phenolic antioxidants, 0.01 to 0.6 wt % of 3-arylbenzofuranones, 0.01 to 0.6 wt % of processing stabilizers based on phosphites, 0.01 to 0.6 wt % of high temperature stabilizers based on disulfides and thioethers and/or 0.01 to 0.8 wt % of sterically hindered amines (HALS) are suitable.

A further object of the invention is a process for producing an industrial polyolefin piping system with improved stiffness, impact strength for use at high service temperature, comprising single- or multilayer pipe fabrication by extrusion of a propylene homopolymer with a melt index of 0.05 to 40 g/10 min at 230° C./2.16 kg at a melt temperature of 195 to 250° C., fitting and valve fabrication by injection molding of a propylene homopolymer with a melt index of 0.05 to 40 g/10 min at 230° C./2.16 kg at a melt temperature of 220 to 290° C., and vessel fabrication by blow molding of a propylene homopolymer with a melt index of 0.05 to 20 g/10 min at 230° C./2.16 kg at a melt temperature of 185 to 230° C., characterized in that the propylene homopolymers used are 8-nucleated propylene homopolymers with an IRτ≧0.98 having a tensile modulus ≧1500 MPa, a Charpy impact strength at +23° C.≧30 kJ/m² using notched test specimens, a Vicat B temperature >90° C. and a heat distortion temperature >100° C.

In the inventive production of industrial polyolefin piping system articles, the extruders for producing the polyolefin pipes can be single screw extruders with an L/D of 20 to 40 or twin screw extruders or extruder cascades of homogenizing extruders (single screw or twin screw). Optionally, a melt pump and/or a static mixer can be used additionally between the extruder and the ring die head. Ring shaped dies with diameters ranging from approximately 16 to 2000 mm and even grater are possible. Advantageous die temperatures for discharging the melt are 180 to 240° C. After leaving the ring-shaped die, the pipes are taken off over a calibrating sleeve and cooled.

Preferably, for the production of injection molded parts of the inventive process for producing an industrial polyolefin piping system, injection molding machines with injection zones are used, which have three-zone screws with a screw length of 18 to 24 D. Preferred mass temperatures for the melt are 240 to 270° C. and temperatures for the injection molds are 20 to 50° C.

Suitable methods for producing the blow-molded articles of the industrial polyolefin piping system are extrusion blow molding, extrusion stretch blow molding, injection blow molding and injection stretch blow molding. The polyolefin mixtures are extruded through annular dies as a tubular parison, molded into a hollow object by being blown into a divided blowing mold, kept at a temperature of 10 to 55° C. and optionally to an additional longitudinal stretching by a stretching stamp and to further radial stretching by blown air. In a second variation, the mixture is injected into an injection mold, heated to 20 to 130° C. to produce the parison, and, after being removed and optionally preferably separate heating of the parison in a conditioning mold to temperatures of 80 to 160° C., especially with a first premolding by blowing, transferred into a blowing mold, and by blowing molded into the hollow body, optionally preferably with additional longitudinal stretching by a stretching stamp.

Preferred applications of industrial poll/olefin piping system are chemical plant constructions comprising single- or multilayer pipes, fittings, valves, chambers and vessels with improved stiffness, impact strength and high service temperature for conveyance of fluids.

The special benefits of the construction parts of the inventive industrial polyolefin piping system are tailor made parts depending on the requirements of service temperatures, conveyed chemical substances and safety aspects.

EXAMPLES

The following tests were made using injection molded test specimen prepared according to ISO 1873

Tensile modulus according to ISO 527 (cross head speed 1 mm/min) at +23° C.

Charpy impact strength, using notched test specimens according to ISO 179/1 eA at +23° C.

Vicat B temperature according to ISO 306

Heat distortion temperature according to ISO 75 Method B

Example 1

1.1 Preparation of the β-Nucleated Propylene Polymer
A mixture of
94 wt % of a propylene homopolymer, obtained by bulk polymerization using a Ziegler-Natta catalyst system with dicyclopentyldimethoxysilane as external donor, having an IRτ of 0.985, and a melt index of 0.2 g/10 min at 230° C./2.16 kg, 6 wt % of a master batch comprising 98.8 parts by weight of a propylene block copolymer having an ethylene content of 8.3% by weight, an IRτ of the propylene homopolymer block of 0.985, and a melt index of 0.30 g/10 min at 230° C./2.16 kg, and 0.2 parts by weight of a mixed crystal of 5,12-dihydro(2,3b)acridine-7,14-dione with quino(2,3b)acridine-6,7,13,14-(5H,12H)-tetrone, and 0.05 wt % calcium stearate, 0.1 wt % tetrakis[methylene(3,5-di-t-butyihydroxyhydrocinnamate)] methane and 0.1 wt % tris-(2,4-di-t-butyl-phenyl)-phosphite, based on the sum of the propylene polymers used, is melted in a twin screw extruder with a temperature profile of 100/145/190/215/225/230/230/215/205/190° C., homogenized, discharged and pelletized.

The resulting polypropylene polymer has a melt index of 0.22 g/10 min at 230° C./2.16 kg, a tensile modulus of 1600 MPa and a Charpy impact strength, using notched test specimens, of 100 kJ/m² at +23° C.

1.2 Manufacture of the Polyolefin Pipe for the Industrial Polyolefin Piping System For producing the propylene polymer pipe for the industrial polyolefin piping system, the β-nucleated propylene polymer of 1.1 is introduced in a single screw extruder (UD=30, D=70mm, temperature profile 200/210/220/220/220/220/200° C., 40 rpm), melted, extruded through a ring shaped die with a diameter of 110 mm, taken off over a vacuum calibrating sleeve as a pipe of a diameter of 110 mm and a wall thickness of 10 mm, and cooled in a 6 m water bath at 20° C., the taking off velocity being 0.5 m/min.

Milled test pieces have a Vicat B temperature of 92° C. and a Heat Distortion Temperature of 110° C.

Example 2

2.1 Preparation of the β-Nucleated Propylene Polymer
A mixture of
94 wt % of a propylene homopolymer, obtained by bulk polymerization using a Ziegler-Natta catalyst system with dicyclopentyldimethoxysilane as external donor, having an IRτ of 0.985, and a melt index of 8.0 g/10 min at 230° C./2.16 kg, 6 wt % of a master batch comprising 98.8 parts by weight of a propylene homopolymer having an IRτ of 0.987, a melt index of 8.0 g/10 min at 230° C./2.16 kg, and 0.2 parts by weight of a mixed crystal of 5,12-dihydro(2,3b)acridine-7,14-dione with quino(2,3b)acridine-6,7,13,14-(5H,12H)-tetrone and 0.05 wt % calcium stearate, 0.1 wt % tetrakis [methylene(3,5-di-t-butylhydroxyhydrocinnamate)] methane and 0.1 wt % tris-(2,4-di-t-butyl-phenyl)-phosphite, based on the sum of the propylene polymers used, is melted in a twin screw extruder with a temperature profile of 100/145/190/215/225/230/230/215/205/190° C., homogenized, discharged and pelletized.

The resulting polypropylene polymer has a melt index of 8.2 g/10 min at 230° C./2.16 kg, a tensile modulus of 1800 MPa and a Charpy impact strength, notched, of 88 kJ/m² at +23° C.

2.2 Manufacture of the Injection Molded Polyolefin Pipe Fitting for the Industrial Polyolefin Piping System The β-nucleated propylene polymer as described in 2.1 is processed in a injection molding machine, which has a three-zone screw with a screw length of 22 D, at a mass temperature of 220° C. and a mold temperature of 50° C. into a pipe fitting having a diameter of 60 mm, a wall thickness of 4 mm and a length of 92 mm.

Milled test pieces have a Vicat B temperature of 91° C. and a heat distortion temperature of 102° C.

Example 3

3.1 Preparation of the β-Nucleated Propylene Polymer
A mixture of
75 wt % of a propylene homopolymer obtained by bulk polymerization using a Ziegler-Natta catalyst system with dicyclopentyldimethoxysilane as external donor, having an IRτ of 0.985 and a melt index of 2.8 g/10 min at 230° C./2.16 kg, 25 wt % of a master batch comprising 99.5 parts by weight of a propylene homopolymer obtained by bulk polymerization using a Ziegler-Natta catalyst system with dicyclo-pentyldimethoxysilane as external donor, having an IRτ of 0.987 and a melt index of 13 g/10 min at 230° C./2.16 kg, and 0.5 parts by weight of hexahydrophthaloylglycine calcium salt, and 0.1 wt % calcium stearate, 0.1 wt % tetrakis[methylene (3,5-di-t-butylhy-droxyhydrocinnamate)] methane and 0.1 wt % tris-(2,4-di-t-butylphenyl)phosphite, based on the sum of the propylene polymers used, is melted in a twin screw extruder with a temperature profile of 100/145/185/210/220/225/225/200/185° C., homogenized, discharged and pelletized.

The resulting polypropylene polymer has a melt index of 3.8 g/10 min at 230° C./2.16 kg, a tensile modulus of 1700 MPa and a Charpy impact strength, using notched test specimens, of 50 kJ/m² at +23° C.

3.2 Manufacture of the Test Container with Rectangular Base for the Industrial Polyolefin Piping System An injection stretch blowing equipment comprising a plasticizing unit with a three-zone screw, a turning table with a quadruple injection mold, a conditioning mold with three heating zones, a blowing mold with a stretching stamp and ejection equipment, the β-nucleated propylene polymer of 3.1 is melted in the plasticizing unit at a temperature profile of 100/150/200/225/215° C. and injected into the quadruple injection mold, which had been heated to 110° C. The parison, weighing 30 g and having a wall thickness of 4.6 to 5.5 mm and a height of 96 mm, is taken by the sleeve of the turning table from the injection mold and brought by a swiveling motion of 90° of the turning table into the electrically heated conditioning mold, the heating zones of which are adjusted to a temperature of 131° C. (bottom of the container parison), of 134° C. (center part of the container parison) and of 131° C. (upper part of the container parison). After a conditioning period of 85 seconds, preblow-molding by compressed air is followed by removal of the blow-molded preform and transfer by means of the sleeve of the turning table by the swiveling motion of the turning table through 90° into the blowing mold, where the blow-molded preform initially is subjected to longitudinal stretching by the stretching stamp and subsequently molded by compressed air at a pressure of 20 bar. The longitudinal stretching of the preform in the blowing mold is 2.8:1 and the radial stretching of the preform is 2.0:1. After 8.0 seconds, the blow-molded control container with rectangular base is removed from the open blowing mold, supplied by the swiveling motion of the turning table through 90° to the ejector and ejected.

To determine Vicat B temperature, test pieces were milled after the container shell was cut open. Vicat test results in a Vicat B temperature of 93° C. A heat distortion temperature of 104° C. was determined.

Example 4

4.1 Preparation of the β-Nucleated Propylene Polymer

A mixture of 95 wt % of a propylene homopolymer, obtained by bulk polymerization using a Ziegler-Natta catalyst system with dicyclopentyldimethoxysilane as external donor, having an IRτ of 0.986 and a melt index of 0.2 g/10 min at 230° C./2.16 kg, 5 wt % of a master batch comprising 97.5 parts by weight of a propylene homopolymer having an IRτ of 0.987 and a melt index of 4.2 g/10 min at 230° C./2.16 kg, and 2.5 parts by weight of N,N'-dicyclohexyl-2,6-naphthalenedicarboxamide, and 0.05 wt % calcium stearate, 0.1 wt % tetrakigmethylene(3,5-di-t-butylhydroxyhydrocinnamate)pmethane and 0.1 wt % tris-(2,4-di-t-butylphenyl)-phosphite, based on the sum of the propylene polymers used, is melted in a twin screw extruder with a temperature profile of 100/145/190/215/225/225/225/205/190° C., homogenized, discharged and pelletized.

The resulting polypropylene polymer has a melt index of 0.28 g/10 min at 230° C./2.16 kg, a tensile modulus of 1750 MPa and a Charpy impact strength, using notched tes specimens, of 90 kJ/m².

4.2 Manufacture of the Polyolefin Pipe for the Industrial Polyolefin Piping System For producing the propylene polymer pipe for the industrial polyolefin piping system, the β-nucleated propylene polymer of 4.1 is introduced in a single screw extruder (L/D=30, D=70mm, temperature profile 200/210/220/220/220/220/200° C., 40 rpm), melted, extruded through a ring shaped die with a diameter of 110 mm, taken off over a vacuum calibrating sleeve as a pipe of a diameter of 110 mm and a wall thickness of 10 mm, and cooled in a 6 m water bath at 20° C., the taking off velocity being 0.5 m/min.

Vicat B temperature was 95° C. and Heat Distortion Temperature was 114° C.

The invention claimed is:

1. Industrial piping system comprised of propylene polymer and comprising single- or multi-layer pipes, fittings, valves, chambers and vessels, the propylene polymer comprising a propylene homopolymer having a melt index of 0.05 to 40 g/10 min at 230° C./2.16 kg, wherein the propylene homopolymer is β-nucleated and has an IRτ≧0.98, a tensile modulus ≧1500 MPa, a Charpy impact strength, using notched test specimens, at +23° C.≧30 kJ/m², a Vicat B temperature >90° C., and a heat distortion temperature >100° C.

2. Industrial piping system according to claim 1, wherein the propylene homopolymer has a melt index of 0.05 to 15 g/10 min at 230° C./2.16 kg.

3. Industrial piping system according to claim 1, wherein the propylene polymer is obtained by polymerization with a Ziegler-Natta catalyst system comprising titanium-containing solid components, an organoaluminum, magnesium or titanium compound as cocatalyst and an external donor according to the formula

$$R_xR'_ySi(MeO)_{4-x-y},$$

wherein R and R' are identical or different and are branched or cyclic aliphatic or aromatic hydrocarbon residues, and y and x independently from each other are 0 or 1, provided that x+y is 1 or 2.

4. Industrial piping system according to claim 3, wherein the external donor is dicyclopentyldimethoxysilane.

5. Industrial piping system according to claim 1, wherein the β-nucleated propylene polymer contains 0.0001 to 2.0 wt %, based on the polypropylene:
dicarboxylic acid derivative diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids, and/or
diamine derivative diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines, and/or
-amino acid derivative diamide compounds from amidation reaction of $C_5$-$C_8$-alkyl-, $C_5$-$C_8$-cycloalkyl- or $C_6$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic monoamines, as β-nucleating agent.

6. Industrial piping system according to claim 1, wherein the β-nucleated propylene polymer contains 0.0001 to 2.0 wt %, based on the polypropylene, quinacridone compounds; quinacridonequinone compounds; and/or dihydroquinacridone compounds, as β-nucleating agent.

7. Industrial piping system according to claim 1, wherein the β-nucleated propylene polymer contains 0.01 to 2.0 wt %, based on the polypropylene, dicarboxylic acid salts of metals from group IIa of the periodic system and/or mixtures of dicarboxylic acids and salts of metals from group IIa of the periodic system, as β-nucleating agent.

8. Industrial piping system according to claim 1, wherein the β-nucleated propylene polymer contains 0.01 to 2.0 wt %, based on the polypropylene, of imido acid salts of metals from group IIa of the periodic system, the imido acids having the formula

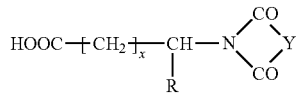

wherein x=1 to 4; R=H, —COOH, $C_1$-$C_{12}$-alkyl, $C_5$-$C_8$-cycloalkyl or $C_6$-$C_{12}$-aryl, and Y=$C_1$-$C_{12}$-alkyl, $C_5$-$C_8$-cycloalkyl or $C_6$-$C_{12}$-aryl- substituted bivalent $C_6$-$C_{12}$-aromatic residues, as β-nucleating agent.

9. Industrial piping system according to claim 6, wherein the quinacridone compounds are quinacridone, dimethylquinacridone and/or dimethoxyquinacridone, the quinacridonequinone compounds are quinacridonequinone, a mixed crystal of 5,12-dihydro(2,3b)acridine-7, 14-dione with quino (2,3b)acridine-6, 7, 13, 14-(5H, 12H)-tetrone and/or dimethoxyquinacridonequinone and the dihydroquinacridone compounds are dihydroquinacridone, dimethoxydihydroquinacridone and/or dibenzodihydroquinacridone.

10. Industrial piping system according to claim 7, wherein the dicarboxylic acid salts from group IIa of the periodic system are pimelic acid calcium salt and/or suberic acid calcium salt.

11. Industrial piping system according to claim 8, wherein the imido acid salts of metals from group IIa of the periodic system are calcium salts of phthaloylglycine, hexahydrophthaloylglycine, N-phthaloylalanine and/or N-4-methylphthaloylglycine.

12. Industrial piping system according to claim 7, wherein the dicarboxylic acid salts from group IIa of the periodic system comprise pimelic acid calcium salt.

13. Industrial piping system according to claim 7, wherein the dicarboxylic acid salts from group IIa of the periodic system comprise suberic acid calcium salt.

14. Process for producing an industrial piping system comprised of propylene polymer and comprising single- or multi-layer pipes, fittings, valves, chambers and vessels, comprising producing industrial single- or multi-layer pipes comprised of propylene polymer for use at high service temperature, comprising extruding a melt, the melt being at a temperature of 195 to 250° C. and being comprised of a propylene homopolymer having a melt index of 0.05 to 40 g/10 min at 230° C./2.16 kg, the propylene homopolymer being β-nucleated and having an IRτ≧0.98, a tensile modulus ≧1500 MPa, a Charpy impact strength, using notched test specimens, at 23° C.≧30 kJ/m², a Vicat B temperature >90° C. and a heat distortion temperature >100° C.

15. Process for producing an industrial piping system comprised of propylene polymer and comprising single- or multi-layer pipes, fittings, valves, chambers and vessels, comprising injection molding a melt, the melt being at a temperature of 195 to 250° C. and being comprised of a propylene homopolymer having a melt index of 2 to 40 g/10 min at 230° C./2.16 kg, the propylene homopolymer being β-nucleated and having an IRτ≧0.98, a tensile modulus ≧1500 MPa, a Charpy impact strength, using notched test specimens, at 23° C.≧30 kJ/m², a Vicat B temperature >90° C. and a heat distortion temperature >100° C.

16. Process for producing an industrial piping system comprised of propylene polymer and comprising single- or multi-layer pipes, fittings, valves, chambers and vessels, comprising producing an industrial vessel comprised of propylene polymer, comprising blow molding a melt, the melt being at a temperature of 185 to 230° C. and being comprised of a propylene homopolymer having a melt index of 1 to 20 g/10 min at 230° C./2.16 kg, the propylene homopolymer being β-nucleated and having an IRτ≧0.98, a tensile modulus ≧1500 MPa, a Charpy impact strength, using notched test specimens, at 23° C.≧30 kJ/m², a Vicat B temperature >90° C. and a heat distortion temperature >100° C.

* * * * *